Oct. 24, 1950　　　　　L. W. LESSLER　　　　　2,527,067
CAMERA CONSTRUCTION
Filed Dec. 23, 1947　　　　　　　　　　　　　　3 Sheets-Sheet 1
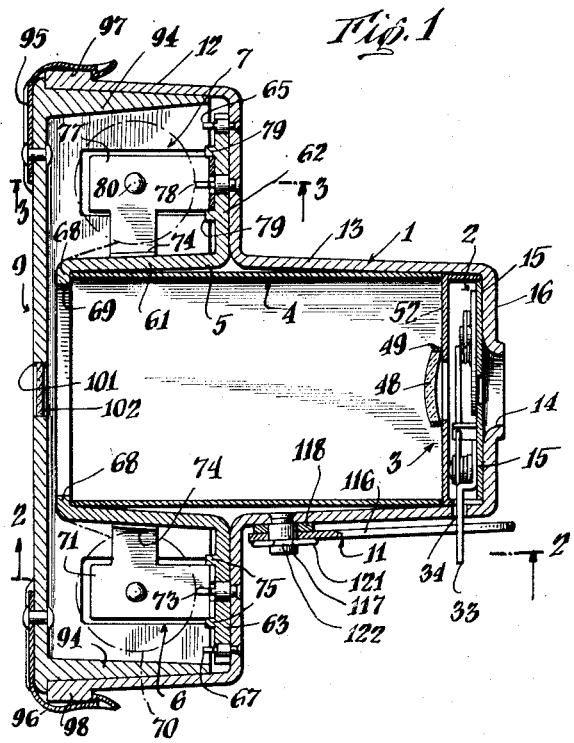
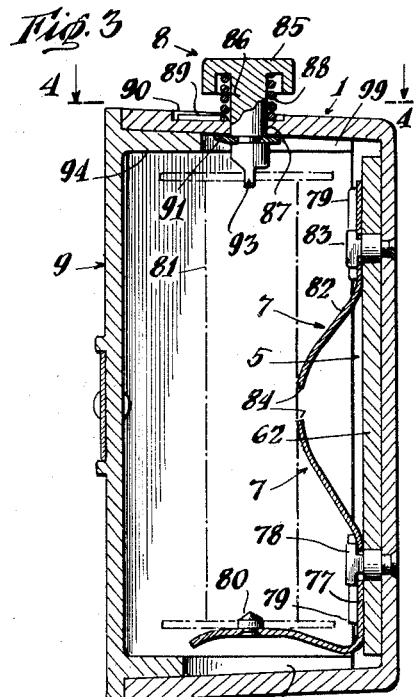
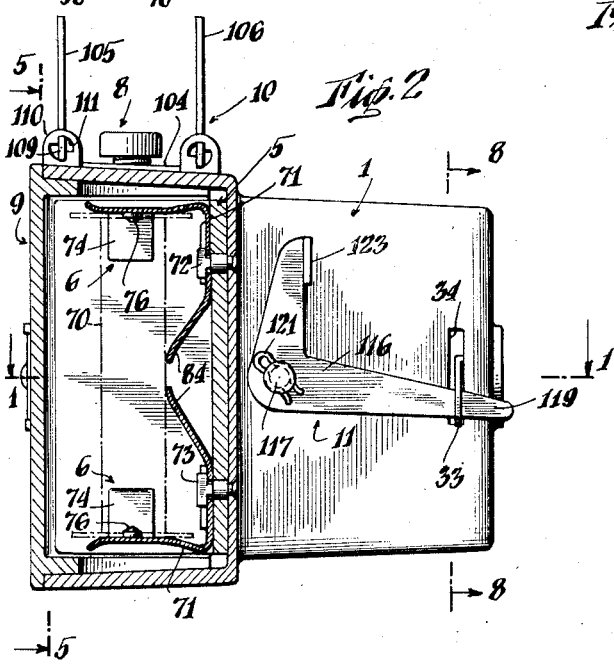
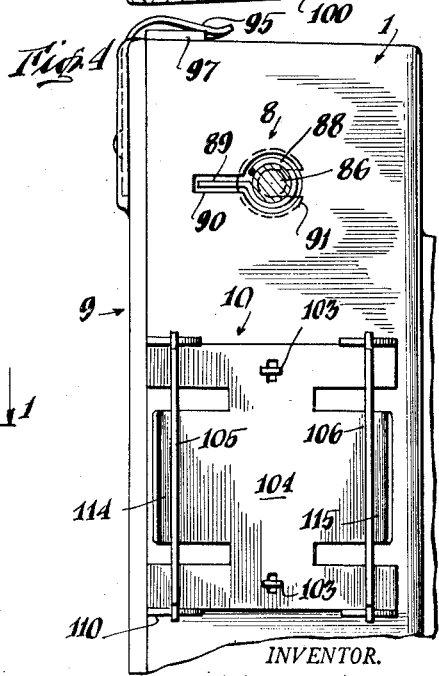
INVENTOR.
Lew W. Lessler
BY Robert S. Dunham
ATTORNEY

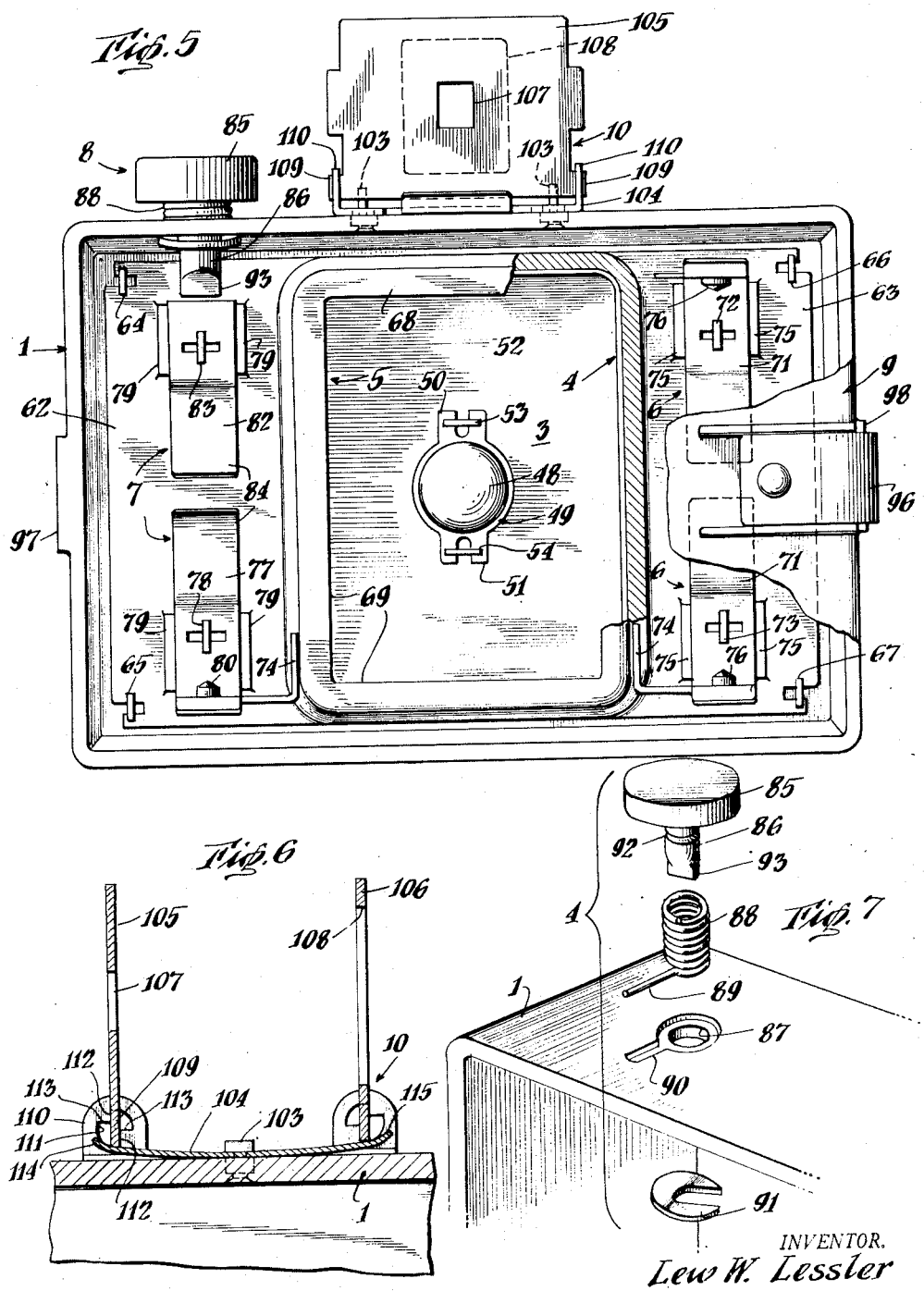

Oct. 24, 1950 L. W. LESSLER 2,527,067
CAMERA CONSTRUCTION
Filed Dec. 23, 1947 3 Sheets-Sheet 3
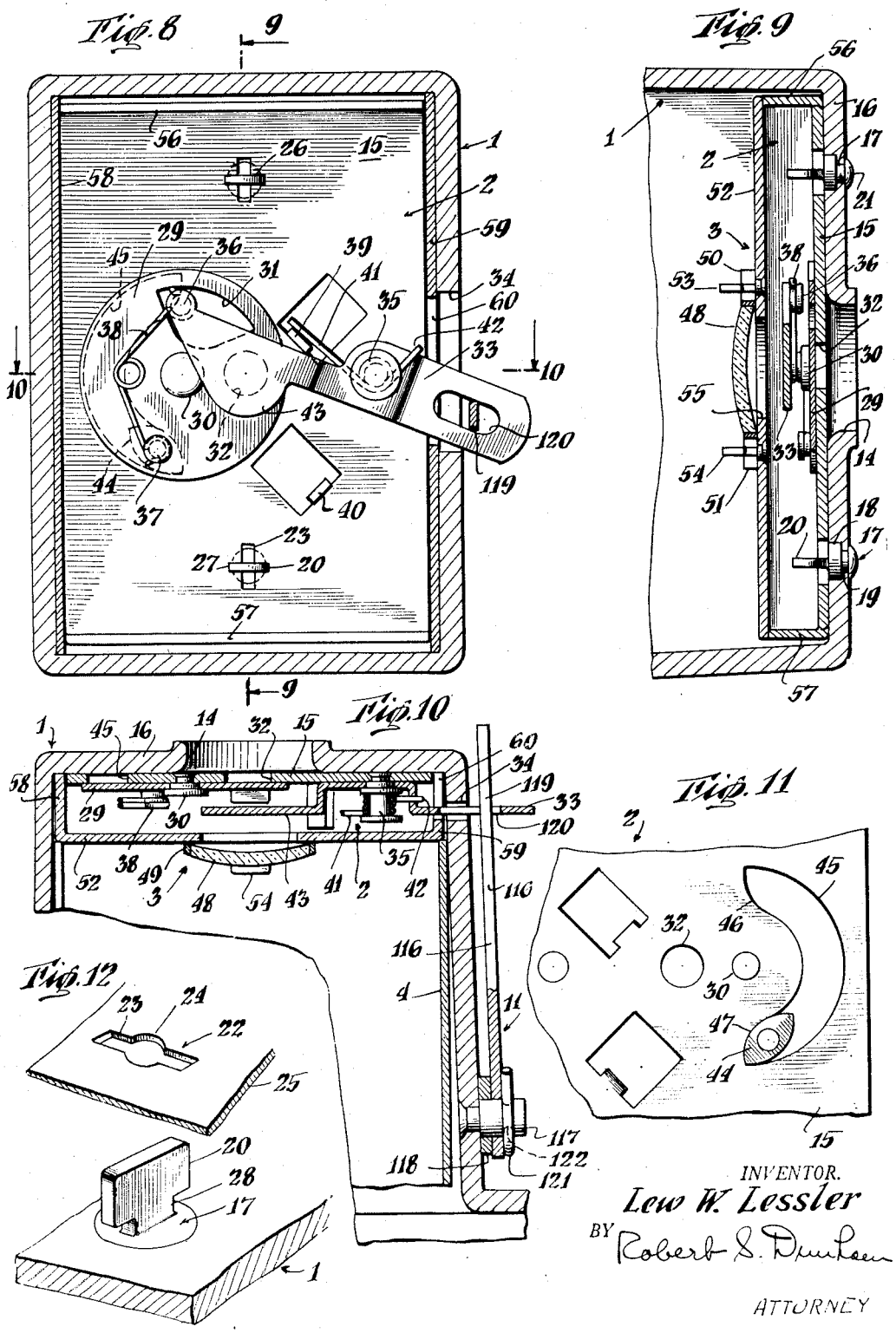
INVENTOR.
Lew W. Lessler
BY Robert S. Dunham
ATTORNEY Patented Oct. 24, 1950

2,527,067

UNITED STATES PATENT OFFICE 2,527,067

CAMERA CONSTRUCTION

Lew W. Lessler, Binghamton, N. Y., assignor to J. J. Tepper Corporation, New York, N. Y., a corporation of New York Application December 23, 1947, Serial No. 793,469

2 Claims. (Cl. 95—31)

This invention relates to a camera construction and more particularly to the construction of a relatively simple type of camera, such as one adapted for making snapshots without adjustment of the time of exposure, lens characteristics, etc., although certain of the principles may be adaptable to cameras having some or all of the conventional adjustments. A particular feature of the camera of the present invention is that it is readily capable of being disassembled and reassembled for purposes of inspection, cleaning, repairing or replacement. It is also possible that a camera in accordance with the present invention may be initially sold and delivered to the ultimate user as a kit of parts or elements arranged to be assembled together to make up the completed camera.

A primary object of the present invention, therefore, is to provide a camera construction made up of a number of elements, some of which may be assembled to the extent requiring skilled assembly operations, while others are made of but one piece, the arrangement being such that the several elements of the camera may be readily assembled and disassembled by relatively unskilled persons, and when assembled, will be properly coordinated with one another so as to cooperate in an exactly predetermined arrangement and so that the desirable results in terms of the taking of pictures may be attained and obtained by such relatively unskilled persons upon the camera being assembled in accordance with simple directions. In this connection it is desired that the several elements of which the camera is composed be of such size, shape and character that they will go together in a substantially foolproof manner and without the use of parts which are likely to get lost or damaged incident to the assembly and disassembly of the camera as a whole.

A further object of the invention is to provide a camera as aforesaid, wherein certain of the elements may be attached to others by the use of simple turn buttons, which may be substantially permanently located in one or more of the parts and thus accurately positioned therein so as accurately to position the other parts to be attached thereto by the turn buttons.

A further object of the present invention is to provide a camera as aforesaid, wherein the arrangement is such that the distance between the lens and a film with which the camera is to be used is accurately predetermined in the assembly of the parts, so that the focus will always be correct within the limitations of the characteristics of the lens means used and so that the best pictures obtainable by the use of the type of lens means with which the camera is equipped may be had.

A further object of the present invention is to provide a shutter assembly for a camera wherein means are provided for cushioning the shock of stopping the movement of the shutter in one, and preferably in both, directions, such means preferably taking the form of a member mounted on and rotatable with respect to the shutter, but only against a substantial resistance, such as a frictional resistance incident to the mounting means for such member.

A further object of the present invention is to provide a view finder for a camera made up in a simple, compact form to provide in its operative position two spaced, substantially parallel plates, each of which has an opening of suitable size, location and shape, so that the usual results from the view finder in the framing of a picture to be taken may be obtained, the view finder parts being arranged to be folded down into a stacked position and being constructed of a minimum of parts arranged together to afford a compact and efficient arrangement. It is a further detailed object of the invention in this respect to provide a view finder wherein one or each of such picture framing plates are provided with hinge means made up as parts of the base and plate respectively, the hinge means providing integral stops for both ends of the movement of the plate between its operative and stacked positions respectively, and wherein other integral means are provided tending resiliently to retain the picture framing plate or plates selectively in either of their two positions.

Other and more detailed objects of the present invention will become apparent as the description proceeds, and will be pointed out in the appended claims, when taken in connection with the accompanying drawings, in which:

Figure 1 is a view of the assembled camera taken substantially in horizontal section on the line 1—1 of Fig. 2;

Fig. 2 is a view substantially in vertical section of the assembled camera as seen substantially on the line 2—2 of Fig. 1;

Fig. 3 is a view of the camera as seen in vertical section on the line 3—3 of Fig. 1;

Fig. 4 is a fragmentary top plan view of a portion of the camera as seen substantially on the line 4—4 of Fig. 3;

Fig. 5 is a view of the camera with most of the rear or cover plate element removed as seen substantially on the line 5—5 of Fig. 2, the view being principally in elevation and the parts being broken away to illustrate the interior construction;

Fig. 6 is a fragmentary view substantially in elevation with a part of the camera body in vertical section showing the view finder element of the camera;

Fig. 7 is a fragmentary exploded view of the film winding means of the camera, showing the assembly and disassembly thereof;

Fig. 8 is a view substantially in vertical section on the line 8—8 of Fig. 2 illustrating the shutter assembly in elevation;

Fig. 9 is a view in substantially vertical section of the front end portion of the camera and of the shutter assembly taken substantially on the line 9—9 of Fig. 8;

Fig. 10 is a fragmentary view illustrating the shutter assembly and a portion of the front of the camera taken substantially in horizontal section on the line 10—10 of Fig. 8;

Fig. 11 is a detailed fragmentary view on an enlarged scale showing the portion of the shutter assembly including the means for slowing down and stopping the shutter at the ends of its path of movement, the view being a rear elevation in respect to the view shown in Fig. 8; and Fig. 12 is a fragmentary detailed view on an enlarged scale illustrating the construction and operation of one of the turn buttons used in assembling the camera and holding the elements thereof in assembled position.

Turning now to the accompanying drawings wherein there is shown a preferred form of the present invention, I have illustrated a camera made up of the following elements, some of which are in part assembled: an outside body member 1, a shutter assembly generally indicated at 2, a lens means generally indicated at 3, a light tube 4, picture framing means comprising a member generally indicated at 5, film supply spool holding and guiding means generally indicated at 6, film take-up spool holding means generally indicated at 7, film winding means generally indicated at 8, a flanged rear cover for the body member generally indicated at 9, a view finding assembly generally indicated at 10, and a finger trigger for actuating the shutter and indicated at 11.

These elements may be readily assembled and dissassembled as may be desired for the purposes of inspection, cleaning, repair or replacement and/or the device as a whole may be originally supplied to the ultimate user as a kit of parts including the several elements hereinabove recited in a disassembled condition for the making of a camera according to the present invention, this being the presently contemplated manner in which the device of the present invention is to be sold commercially. The elements of the camera are in some instances single units, i. e. one piece units, while in other cases they are sub-assemblies in instances such, for example, as in the case of the shutter assembly 2, where the making of the sub-assembly requires specially skilled workmanship, which could not in some instances at least be effectively accomplished by relatively unskilled personnel. The parts have been listed hereinabove in approximately the order in which they are assembled and will be described in greater detail hereinafter in that order, the method of assembling being considered in conjunction with the description of the several parts.

The outside body member 1 comprises a substantially T-shaped casing, the shape and general formation of which are clearly illustrated in Figs. 1 and 2, this casing comprising an open back substantially rectangular portion 12 forming the cross of the T and having a forward extension 13 forming the stem of the T, thus simulating in general the outlines of currently popular types of cameras sometimes known as "candid cameras." The forward extension 13 has an aperture 14 at its forward end (at the right as seen in Fig. 1) through which the light passes from the object to be photographed to the film with which the camera is designed to be equipped. The back or rear portion, at the left as seen in Figs. 1 and 2 is left open and is arranged to be closed during operation by the flanged rear cover 9, which may be removed to permit access to the film cavity space for the insertion or removal of film in the taking of pictures and for the insertion and removal of other parts in the assembly and disassembly of the camera as a whole. The body member 1 may be made of any suitable material such as some of the known organic plastic materials, metal, or other materials known in the art. This member is further provided as hereinafter described with means preferably formed non-removably therewith for securing many of the other parts in their assembled relation.

The shutter assembly generally designated at 2 is the first element usually to be inserted into the body member 1 in the assembly of the camera. This element fits as clearly shown in Figs. 1 and 10 into the forward end of the forwardly projecting portion 13 of the body member 1 and is arranged to be secured to the body member in a manner to be particularly described. The shutter assembly comprises a plate member 15 serving as a base for the assembly as a whole and which is adapted to be seated against the right-hand wall 16 as seen in Fig. 1 of the extension 13 of the body member 1 (see also Fig. 10). All the parts of the shutter assembly are substantially non-removably mounted upon the plate 15.

For securing the shutter assembly and other parts in the body member, any suitable means could be used, including nuts and bolts or other securing means known in the art. However, I prefer to provide turn buttons, one of which is shown in enlarged detail in Fig. 12 and is also shown in Figs. 8 and 9, these turn buttons having the advantages first that they have no removable parts which may become lost during assembly or disassembly and, second, that they provide a means for accurately securing parts in an exactly predetermined position. Each turn button comprises a metallic member as shown generally at 17, Fig. 12, which is rotatably mounted in a suitable recess or aperture in the wall of one member such as the body member 1, but which may be rotated in respect thereto. For this purpose each turn button has a large diameter portion as seen at 18, Fig. 9, and a small diameter portion 19 concentric with one another and located in suitably sized aperture portions within the thickness of the wall with which the turn button is substantially permanently associated. The rear end of the turn button 17 (right in Fig. 9), at the rear of the wall with which it is associated (i. e. the portion opposite the button part proper 20), is riveted or peened over as shown at 21 in such a manner that the turn button may be readily rotated but only against a substantial friction. In practice a small wrench having a slot of a size to fit easily over the button portion proper 20 may be provided the user to assist him in the assembly and disassembly of the parts. Such a wrench is of ordinary construction and may be made in any number of designs. The details of the wrench form no part of the present invention, so that it is not illustrated herein, it being understood that any suitable tool may be used for rotating the turn buttons. The parts to be associated with each turn button and to be secured thereby to the part with which the turn button is nonremovably associated as aforesaid is provided with a slot as generally indicated at 22, Fig. 12, and which may include an elongate rectangular portion 23 and a central cylindrical portion 24. Once the turn button is positioned in alignment with the longitudinal axis of the elongate portion 23, the part such as generally indicated at 25, Fig. 12, which is to be secured by the turn button, may then be placed over it with the cylindrical part 24 coaxial with the turn button. The button may then be rotated through an angle of 90° in either direction to secure the removable part 25 to the relatively fixed part indicated as the body member 1, with which the button is non-removably associated. It will be understood that wherever turn buttons are referred to hereinafter a button as just described and as clearly illustrated in Figs. 8, 9 and 12 will preferably be used, although it is within the purview of the present invention to use other securing means as may be desired.

In securing the shutter assembly 2 to the inside of the stem of the T of the outside body member 1 there are preferably provided two turn buttons indicated at 26 and 27, these turn buttons thus positively and accurately positioning the shutter assembly 2 in respect to the body member 1. The slot portion shown at 28 between the head portion of each button and the larger diameter portion 18 thereof is preferably formed of substantially the exact thickness of the member such as 25, which the button is to secure, so that such member is secured against movement in a direction axially of the turn button as well as against movement laterally thereof.

In general the construction of the shutter assembly may follow conventional or known arrangements although one part at least of the shutter herein particularly shown and described is believed to involve invention as will be particularly pointed out in connection with the description of this feature. The shutter as shown preferably comprises a rotatable shutter member 29, which is mounted for free rotation with respect to and parallel with the plate 15 by an axial stud 30 as seen in Figs. 8 to 10. This shutter has a sector shaped opening 31 therein which is adapted at one position of the shutter to open an exposure aperture centrally of the plate 15, this aperture in the plate 15 being indicated at 32. It will be understood that the shutter member 29 is freely rotatable about the stud 30.

Means are provided for actuating the shutter 29 to move it by an oscillatory movement between its terminal positions. For this purpose there is provided a lever 33, the outer end of which projects through a slot 34 formed in one wall of the projection 13 of the main body member 1, so as to be accessible exteriorly of the camera. The lever 33 is mounted for free rotation on a stud 35 which is substantially permanently secured in the plate 15 as best shown in Fig. 10. At its inner end the lever 33 carries a stud 36 which is connected to a stud 37 carried by the shutter 28 through a light hairpin spring 38. The lever 33 may be moved between two stops shown at 39 and 40 respectively, a coil spring 41 being mounted about the stud 35 and have its ends engaging a part of the lever 33 at 42 and the stop member 39 respectively tending to urge the lever 33 toward the position shown in Fig. 8. The arrangement thus far described for the operation of the shutter is one providing a conventional over-center-throw means for moving the shutter at a substantially predetermined speed in both directions between the terminal positions thereof, which are limited as hereinafter described. In the arrangement shown the shutter can only be kept in its terminal position opposite from that shown in full lines in Fig. 8 by a continuous manual pressure on the outside of the lever 33 holding the right-hand end thereof as seen in Fig. 8 in its uppermost position.

In order that the shutter 29 shall expose the film in only one direction of its movement, a portion of the lever 33 to the left of its pivot stud 35 may be enlarged as shown at 43 Fig. 8 so as to be positioned over the view opening, i. e. in alignment with the aperture 32 of the plate 15 as the shutter 29 is returning from its other terminal position to the position shown in Fig. 8, it being understood that the lever 33 will be substantially in this position (as shown, Fig. 8) before the shutter starts its return movement to cause the opening 31 to pass the opening 32 a second time. The portion of the shutter assembly thus far described is believed to be substantially conventional.

Novel means are provided, however, in accordance with the present invention and forming a part thereof for assisting in slowing down or dampening the shutter movement at one, and preferably at both ends of its stroke. For this purpose the shutter 29 preferably carries a member best illustrated at 44 in Fig. 11. This member is preferably rotatably secured to the shutter by a part of the stud 37 and which is preferably substantially concentric with the member 44. The member 44 is arranged to move in a substantially semi-circular slot 45 formed in the plate 15, the ends of this slot positively determining the limits of movement of the shutter about its axis stud 30. In the preferred construction the member 44 is of such dimensions that it will lie between the planes defining the opposite surfaces of the plate 15. The shape of the member 44 and the shapes of cam portions 46 and 47 defining a part of the ends of the slot 45 are such that the member 44 will be rotated with respect to the shutter 29 at each end of the shutter movement by engagement with the cam surfaces 46 or 47, so as to require the overcoming of the frictional resistance incident to rotating the member 44 in respect to the shutter 29, which will dissipate some of the energy of momentum of the shutter movement and will cushion the stopping of this movement in both directions.

While there is herein shown an arrangement for cushioning this movement in both directions, it is to be understood that the provision of such an arrangement in one direction only provides obvious advantages, even though the arrangement is not provided at both ends. The preferred form of the present invention, however, includes the provision of the cushioning arrangement including the member 44 and the cam surfaces 46 and 47 at both ends of the oscillatory movement of the shutter. Furthermore, while the shutter in the present construction is shown as rotatable about a center with respect to its support, a shutter movable in a straight line could similarly be provided with a stop cushioning means equivalent to that shown within the purview of the present invention.

The next assembly to be inserted in putting the camera elements together is the lens means 3. This lens means includes a conventional lens offering an average focus which will be satisfactory for snapshot work under average conditions and which is positioned at an exactly predetermined position, so that the picture will be in proper focus for average conditions, no attempt being made in the device herein particularly shown and described to provide for adjustment of an exposure opening or focal length. As shown, the lens per se is illustrated at 48 and may be substantially rigidly secured in a bezel 49, the latter having bifurcated tabs 50 and 51 by which the lens may be accurately secured to a plate 52 by turn buttons as shown at 53 and 54. Alternatively the lens and bezel may be molded of a suitable transparent material such as methyl methacrylate as a single integral unit. The plate 52 has a central exposure aperture 55 therein in axial alignment with the aperture 32 in the shutter assembly plate 15 when the parts are in assembled position and with which the lens 48 is also arranged to be secured in axial alignment as aforesaid.

In order that the lens 48 be spaced from the front of the camera frame by a predetermined distance and to assure that the shutter assembly parts which are adapted to move as aforesaid will have ample space for such movement, the shutter assembly plate 15 is provided with flanges shown at 56 and 57, at its upper and lower ends respectively, engaging the upper and lower ends of the plate 52 of the lens assembly, while the lens assembly plate 52 may have forwardly directed flanges at the lateral sides thereof as shown at 58 and 59, Fig. 10, engaging against the front wall 16 of the body member 1 to secure the lens assembly against possible misplacement, at an angle for example to its desired accurately predetermined assembly position. The flange 59 is provided with a suitable notch 60 substantially coincident with the slot 34 in the body member to permit the through passage of the lever 33 as shown in Figs. 8 and 10.

The next element to be assembled in the camera in the ordinary method of assembly is the light tube 4. This element may be preformed into the shape of a hollow substantially rectangular prism as shown, or preferably it may be formed as a flat piece provided with suitable score lines, so that it can be folded to bring it to the desired shape. The member 4 may be made of any suitable type material such as a heavy paper or cardboard, chip board, or if made in a preformed hollow prism form, even of substantially rigid plastic material. It is preferably black so as not to reflect any light which may impinge upon it. The light tube serves to confine the light flow when the exposure opening is uncovered during the taking of a picture from the lens to the portion of the film to be exposed as hereinafter described. The light tube further serves as hereinafter more fully set forth by its engagement with the plate 52 of the lens means 3 to hold this lens means in its operative position as aforesaid in response to the means hereinafter described for positioning the left-hand end as seen in Fig. 1 of the light tube 4.

The next element to be assembled in the camera is the picture framing means 5. This means is shown as a single or one piece member, which may be of any material which could be used in the forming of the outside body member 1 and which in the preferred form of the invention is of a suitable plastic material. This means or member is provided with a central portion 61 substantially in the form of a hollow rectangular prism and of a size to surround the left-hand end of the light tube 4 as seen in Fig. 1. Extending outwardly from this portion are flange portions 62 and 63 bearing against the underside of the cross of the T, considering the shape of the outside body member 1. The flanges 62 and 63 may be secured to the body member 1 by a plurality, in this case four, turn buttons shown at 64, 65, 66 and 67, Fig. 5, these turn buttons engaging suitable slots formed as best shown in Figs. 1 and 5 in the outside corner portions of the flanges 62 and 63. The picture framing means 5 is thus accurately positioned in an exactly predetermined position in respect to the outside body member 1. At the left-hand end as seen in Fig. 1 of the prism shaped portion 61 of the member 5 there are inturned flanges 68 defining a picture frame opening 69 of the exact shape and size which is desired for the picture to be taken by the camera. It will be understood that in the operation of the camera, the film will be held against the flanges 68 of the member 5 at the left thereof as seen in Fig. 1. The flanges 68 also serve to confine and accurately to position the left-hand end of the light tube 4 and thereby to confine and position the lens means 3 using the light tube 4 as a spacer for this purpose. In this way the distance between the lens 48 and the film on which a picture is to be taken is accurately determined.

Once these parts as aforesaid are in assembled position the next step is usually to put into place the film spool holding means and the film winding means 6, 7 and 8, the particular order in which these elements are assembled being immaterial. A film supply spool is adapted to be positioned as shown in dotted lines at 70, Fig. 1, and also as shown in Fig. 2. Means are provided, preferably in the form of metal clips and generally designated at 6, for holding and guiding such a film supply spool. Each of these means comprises an angular member 71 preferably of spring metal bent at the angles as shown and arranged to be secured to the outside body member 1 and against the flange 63 of the picture framing means by suitable securing means such as turns buttons 72 and 73. In the preferred embodiment of the invention there are two similar spool holding means 71 as shown made as right and left-hand members and each arranged to be secured by one of the turn buttons 72 or 73 respectively. Each of the members 71 further has an extended portion 74 adapted to bear against one wall of the central portion 61 of the picture framing means 5. While it might be possible to use more than one turn button for each of the members 71, so as accurately to position such members by the turn buttons alone, it is preferred to simplify the construction so as to use a single turn button to hold the members generally in position and to prevent the rotation of each member 71 about the axis of its respectively associated turn button by providing recesses formed in the flange 63 or providing equivalent means as shown in Fig. 1 as by a pair of parallel ribs 75 formed on the flange 63 and arranged to engage opposite edges of the intermediate portions of the members 71. In this way each member 71 will be held by its respective turn button 72 or 73 in an exactly predetermined position. Each member 71 is further provided with suitable means, such as a stud 76, as a center pin for engaging the end of a film spool in the usual manner, these studs 76 being formed either as separate pieces riveted or otherwise secured at the proper point in each member 71 or as struck-up portions thereof, integral therewith.

Referring now to Figs. 1 and 3, the take-up film spool holding means 7 may be formed and located in a manner generally similar to the means 6 just described for holding the film supply spool and including a bent member 77, which is essentially similar to the member 71 and which may be secured as by a turn button 78 to the outside body member 1 and the flange 62 of the picture framing means. It will be understood that the flange 62 similarly has ribs 79 corresponding to the ribs 75 for preventing the rotation of the member 77 about the axis of the turn button 78. The member 77 has a suitable stud 80 as a center stud for engaging the end of a film take-up spool generally indicated at 81 (in dot and dash lines) at its end remote from that engaged by the winding means 8.

The other film guiding means forming a part of the element 7 is shown as a member 82 similar to a part only of the member 77 and secured as by a turn button 83 to the body member 1 and the flange 62, ribs 79 being similarly employed to prevent rotation of the member 82 about the axis of the turn button 83. In securing the members 71, 77 and 82, the turn buttons 72, 73, 78 and 83 are all preferably mounted in the body member 1 and extend freely through suitable apertures in the flanges 62 and 63 of the picture framing member 5. As a further possible modification, turn buttons 64 to 67 inclusive may be omitted and the turn buttons 72, 73, 78 and 83 depended upon to hold the picture framing means 5 to the body member 1. Furthermore, each of the members 71, 77 and 82 has a spring finger portion as illustrated at 84 adapted to engage against the center portion of the film wound on the associated spool as best illustrated in Figs. 2 and 3.

The film winding means 8 provided in accordance with the present invention is best illustrated in Figs. 3, 4, 5 and 7, and is substantially conventional in character as a non-reversible winding means. It includes a knob member 85 having a substantially cylindrical stem 86 adapted to project through a cylindrical aperture 87 on the body member 1. Surrounding the stem 86 outside the body member and within the skirt portion of the knob 85 is a helical spring 88 having one end extending radially outwardly at 89 and arranged to be received in a suitable slot 90 to prevent the rotation of the spring. The knob 85 may thus be rotated freely in the direction tending to unwind the spring from the stem portion 86 for winding the film on the spool 81; but the spring will bind on the stem in a known manner, so as to prevent reverse rotation of the knob 85. The knob 85 is held in its desired position as shown in Fig. 3 by a suitable horseshoe shaped washer 91, which is adapted to engage in an annular groove 92 in the stem 86 of the winding means as best shown in Fig. 3, this washer being bent at an angle as shown so as to urge the knob 85 inwardly of the outside body member 1. At its inner end the stem 86 is provided with a flattened portion 93 to engage the usual diametrical slot in a film spool so as to wind film thereon. It will be understood that in the insertion of film spools into the means 6, 7 and 8, the portions of the members 71 and 77 carrying the centering pins 76 and 80 are sufficiently resilient to be flexed to permit the insertion and removal of the film spools.

In completing the assembly of the camera proper there is also required a backplate or rear cover member indicated at 9. This member is provided with a deep flange portion 94 arranged to telescope within the body member 1 in the assembled position of the parts shown in Figs. 1, 2 and 3, so as to preclude all light striking the film except that intentionally admitted through the exposure opening under control of the shutter. The rear cover may be formed of any suitable material, preferably the same as that of the body member 1, and may be provided with any suitable means for securing it in its desired assembled position. As shown the member 9 has suitably secured thereto, as by rivets, metallic spring clip members 95 and 96 for engagement with suitable portions formed on and preferably integral with the body member 1, here shown as bosses 97 and 98. The flange 94 of the rear cover member will be provided with suitable slots where necessary, providing for the closing of this member without interference with other parts such as the winding means 8, for which a slot 99 (Fig. 3) is provided. In order that the parts may be assembled in one desired order only, none of the other slots, one of which is shown at 100, Fig. 3, are as wide as is slot 99 so that the cover may not be placed inside the body member in a reversed relationship, in which it may not fit with adequate tightness due to possible irregularities in the manufacturing operations.

At an appropriate point in the rear cover member there is provided the usual aperture 101 covered by a red transparent member 102 through which a number characteristic of the film space to be exposed may be visible in the usual manner.

There is normally used in connection with the camera constructed as aforesaid a view finding assembly 10 which, while not entirely essential, is a desirable element of the general combination. This assembly is particularly illustrated in Figs. 2, 4, 5 and 6 to which reference is now directed. The assembly is adapted to be secured to the outside body member 1 as by a pair of turn buttons 103 which are fixed in but rotatable in respect to the body member 1 and which project upwardly through suitable apertures in a base member 104 of the assembly 10. In this way the assembly 10 is accurately positioned in respect to the camera as a whole.

The assembly 10 in general includes a pair of picture sight plates 105 and 106 which in their operative positions, as shown in the several figures, are arranged to be disposed in substantially parallel planes and are also arranged to be folded down upon and substantially parallel with the base member 104 in a stacked position. To permit of this movement, each of the picture sight plates 105 and 106 is pivoted to the base member 104 by a pivotal means which is substantially the same for both plates, so that but one such means need be described. The plates 105 and 106 are each provided with apertures shown at 107 and 108 respectively of such size and disposition, in consideration of the distance between them, as to coordinate the view visible therethrough with the field which may be registered photographically upon the film when taking a picture.

Considering the mounting of the plate 105, this plate is provided with a pair of projections 109 acting as pintles for the hinge means for the plate, the projections 109 being rectangular in cross section as seen for example in Fig. 6. The base plate 104 has a pair of integrally extended portions or projections bent upwardly into substantially vertical planes as shown at 110, each of the projections 110 having a particularly shaped aperture 111 formed therein as best shown in Fig. 6. Each such aperture is formed by a pair of intersecting sector shaped openings, so as to permit of a substantially 90° swinging movement of the associated pintle portion 109 in the aperture and to provide stop shoulders 112 for limiting the movement of the plate 105 at its operative position and 113 for limiting such movement at the inoperative, horizontal or stacked position of the plate. The center of the arcuate portions of the apertures 111 is the axis of rotation of the plate. It will be understood that the plate 106 is similarly mounted except that it is arranged for rotation in a counterclockwise direction from the operative position thereof shown in Fig. 6, while the plate 105 is rotatable only in a clockwise direction from its operative position as seen in that figure. Another difference is that the axis of rotation of one of the plates, preferably that of the plate 105, is preferably slightly more distant from the general plane of the base member 104 than is that of the other plate as the plate 106. The reason for this is so that the plates may be stacked in substantially parallel relation without interference with one another. This is also permitted by making the distance between the axis of rotation and the remote edge of the plate, which is lower when stacked, and which edge is parallel to such axis, slightly less than the distance between the parallel axes of rotation of the plates respectively.

Means are provided in conjunction with the view finding means for resiliently holding the plates 105 and 106 in either of their two positions respectively. In the present instance such means is substantially the same for each plate and comprises an extension integral with the base plate 104, such as that shown at 114 cooperating with the lower edge of plate 105 as best shown in Fig. 6 and a corresponding portion 115 of the base member 104 cooperating with the lower edge of the plate 106. Thus by forming the base member 104 of fairly rigid spring metal of a suitable type, this member and the plates 105 and 106 may combine to form the base, the two plates, hinge means, stop means and the means holding the plates resiliently in either of their two rotated positions. This simplified construction using a minimum number of parts, in this case three, is believed to be a novel portion of the present invention.

It is sometimes desirable in cameras of this type to provide a trigger member operable by the finger of an operator at a convenient position to snap the shutter in the taking of a picture. Such construction is, however, not absolutely necessary as the camera is completely operative without it, although possibly not with as great convenience. There is provided in accordance with the present invention, a finger trigger element 11, which is one of the elements above enumerated of the camera as a whole. This trigger member comprises a bell crank lever 116, see Figs. 1, 2, 8 and 10, which is arranged to be mounted on a fixed axis formed as a stud 117 secured in the body member 1 and projecting laterally from one side of the projecting wall 13 thereof, the same side through which the lever 33 projects. The stud 117 is rigidly mounted in the wall 13 as best shown in Fig. 1. The remaining parts may be assembled thereon as follows: first, a spacing washer 118 may be placed loosely on the stud 117; then the bell crank lever 116 may have its reduced end shown at 119, passed loosely through an aperture 120 in the lever 33 as shown in Figs. 2, 8 and 10; then the pivotal portion of the bell crank lever 116 is placed loosely on the stud 117; following which this lever 116 is secured on the stud against dislocation therefrom. In the accompanying drawings, this securing means is shown as a hairpin type clip 121 which is adapted to embrace an annular groove 122 of the stud 117 so as to prevent the lever 116 from accidental dislocation from its assembled position. At its upper end the bell crank lever 116 has an integral finger piece 123, which may be knurled or roughened to prevent the finger from slipping in the taking of a picture.

From the foregoing, it will be obvious how the camera as a whole may be easily and quickly disassembled and reassembled or initially assembled by relatively unskilled persons. Upon reassembly the several enumerated elements will be each accurately and exactly positioned in a predetermined desired relationship even by unskilled personnel. I contemplate that while there has been but one form of the invention shown and particularly described, various equivalent means may be substituted as and where desired in accordance with the knowledge of those skilled in the art. I do not wish to be limited, therefore, except by the scope of the appended claims, which are to be construed validly as broadly as the state of the prior art permits.

What is claimed is:

1. A camera, comprising the following elements: (1) an outside body member of substantially T-shape, (2) a shutter assembly, (3) a lens means, (4) a light tube, (5) picture framing means, (6) film supply spool holding and guiding means, (7) film take-up spool holding means, (8) film winding means, and (9) a flanged rear cover for said body members; mechanical means for independently detachably securing said shutter assembly and said picture framing means to said body member with said shutter assembly inside said body member at the bottom of the stem of the T and said picture framing means inside said body in the cross of the T, said lens means and said light tube being of a size to fit into the stem of the T and to be secured thereby against dislocation laterally of the stem of the T and being held against movement longitudinally of the stem of the T by and between said shutter assembly and said picture framing means, and separate and distinct mechanical means for securing said enumerated elements (6) to (9) inclusive to an exactly predetermined assembled position in respect to said body member, whereby said enumerated elements may be disassembled and reassembled for inspecting, cleaning, repairing and replacement.

2. A camera, comprising the following elements: (1) an outside body member of substantially T-shape, (2) a shutter assembly including over-center-throw type shutter and an actuating lever adapted to project through said body member in the assembled position of said elements to be actuated from the outside of said body member, (3) a lens means including an apertured plate and a lens permanently enclosed in a bezel with means for detachably securing said lens and said bezel as a unit to said plate with the lens concentric with the aperture of said plate, (4) a light tube, (5) picture framing means serving to position a film to be used in said camera in a predetermined position in respect to said lens and further serving to confine said light tube and the plate of said lens means between a part of said picture framing means and said shutter assembly when said shutter assembly is located in its predetermined assembled position inside said body member at the bottom of the stem of the T-shape thereof, (6) film spool holding and guiding means, (7) film take-up spool holding means, guide ribs formed as parts of said picture framing means for assisting in positioning elements numbered (6) and (7), (8) uni-directional film winding means, (9) a flanged rear cover for said body member, (10) a view finding assembly, and (11) a finger trigger for actuating the shutter in taking a picture; a plurality of turn buttons rotatably and non-detachably mounted in said body member for securing elements numbered (2), (5), (6), (7) and (10) thereto, means for detachably securing said film winding means to said body member, the flange means of said rear cover telescoping inside the cross portion of the T-shape of said body member to prevent access of light thereinto when the cover is in position, resilient means for detachably clamping said cover to said body member, and means for detachably mounting said finger trigger on the outside of said body member, whereby said enumerated elements may be disassembled and accurately reassembled for inspection, cleaning, repairing and replacement.

LEW W. LESSLER.

REFERENCES CITED

The following references are of record in the file of this patent:

UNITED STATES PATENTS

| Number | Name | Date |
| --- | --- | --- |
| 775,261 | Bornmann | Nov. 15, 1904 |
| 975,278 | Pond | Nov. 8, 1910 |
| 1,171,639 | Pipon | Feb. 15, 1916 |
| 1,438,230 | Gilbert | Dec. 12, 1922 |
| 1,608,467 | De Haes | Nov. 23, 1926 |
| 1,684,821 | Eastman | Sept. 18, 1928 |
| 2,029,476 | Githens | Feb. 4, 1936 |
| 2,076,191 | Adams | Apr. 6, 1937 |
| 2,078,432 | Whitlock | Apr. 27, 1937 |
| 2,323,009 | Claudot et al. | June 29, 1943 |
| 2,367,195 | Bolsey | Jan. 16, 1945 |
| 2,378,406 | Harris | June 19, 1945 |
| 2,409,605 | Bolsey | Oct. 15, 1946 |

FOREIGN PATENTS

| Number | Country | Date |
| --- | --- | --- |
| 798,215 | France | Mar. 2, 1936 |